United States Patent

Franklin

[11] Patent Number: 5,082,039
[45] Date of Patent: Jan. 21, 1992

[54] ANTI-SKID CHAIN FOR VEHICLE TIRES

[75] Inventor: Charles R. Franklin, Fusine Valromana, Italy

[73] Assignee: Acciaierie Weissenfels S.p.A., Valromana, Italy

[21] Appl. No.: 344,223

[22] Filed: Apr. 27, 1989

[30] Foreign Application Priority Data

Mar. 1, 1989 [DE] Fed. Rep. of Germany ....... 3906486

[51] Int. Cl.⁵ .................. B60C 27/10; A43C 11/00
[52] U.S. Cl. .................... 152/241; 152/219; 152/239; 24/68 TT
[58] Field of Search ............ 152/213 R, 213 A, 217, 152/218, 219, 221, 231, 233, 239, 241; 24/68 CT, 68 TT, 69 TT, 300, 301, 230.5 AD

[56] References Cited

U.S. PATENT DOCUMENTS

| 1,615,570 | 1/1927 | Clark . | |
|---|---|---|---|
| 2,436,709 | 2/1948 | Bozenhard et al. | 152/219 |
| 2,458,642 | 1/1949 | Reynolds | 152/213 |
| 4,215,733 | 8/1980 | Rieger et al. | |
| 4,665,589 | 5/1988 | Gregorutti | 24/69 TT |
| 4,754,531 | 7/1988 | Skyba | 24/300 |

FOREIGN PATENT DOCUMENTS

| 242435 | 10/1987 | European Pat. Off. . |
| 7518886.2 | 6/1975 | Fed. Rep. of Germany . |
| 8402467.4 | 5/1984 | Fed. Rep. of Germany . |
| 2731296 | 2/1987 | Fed. Rep. of Germany . |
| 3347989 | 10/1987 | Fed. Rep. of Germany . |
| 8902454 | 3/1989 | Fed. Rep. of Germany . |
| 2314065 | 1/1977 | France . |
| 2458409 | 2/1981 | France . |
| 2630682 | 11/1989 | France . |
| 210268 | 4/1987 | Italy . |
| 476585 | 9/1969 | Switzerland . |
| 649505 | 5/1985 | Switzerland . |

Primary Examiner—John J. Gallagher
Assistant Examiner—Gregory J. Wilber
Attorney, Agent, or Firm—McAulay Fisher Nissen Goldberg & Kiel

[57] ABSTRACT

An anti-skid chain for a vehicle tire comprises an inner and outer harness. The outer side harness comprises a closed loop harness line with elastic expansion members acting as a damping elements. A locking device is attached at one end of the harness line and a tensioning chain at the other end passes through the locking device, which permits movement of the tensioning chain for tensioning and prevents movement in the opposite direction. The inner side harness comprises a ring-shaped resilient stirrup which can be elastically spread apart for slipping across the tire tread. Closure members on the free ends of the stirrup lock the stirrup closed on release of the stirrup.

30 Claims, 3 Drawing Sheets

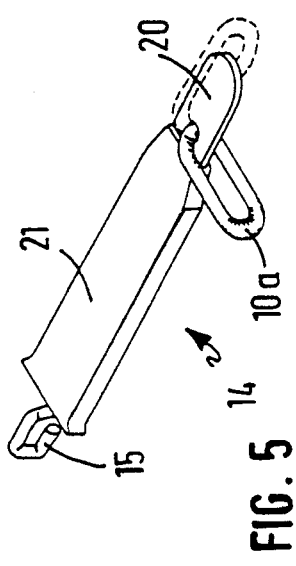
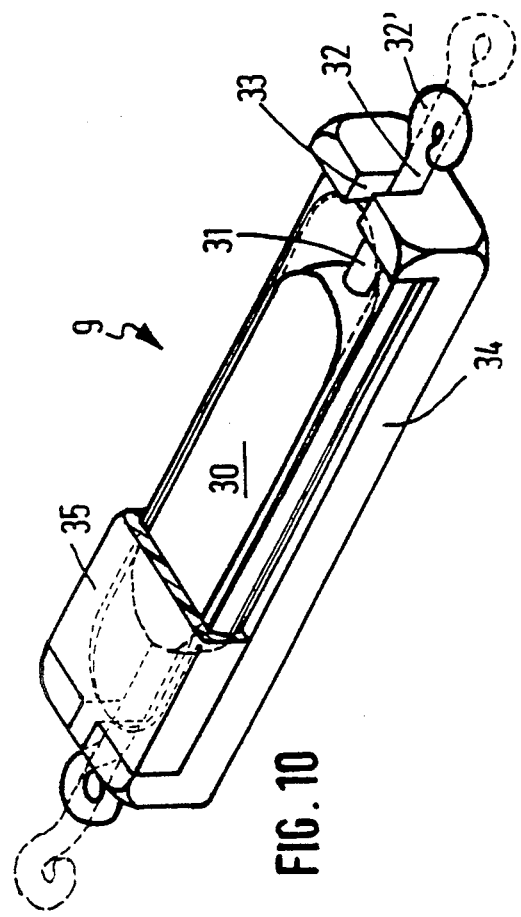
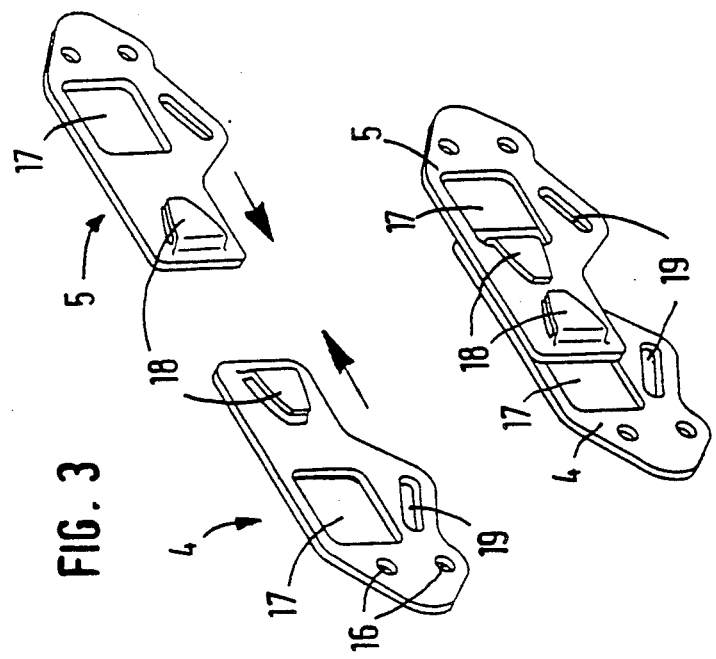

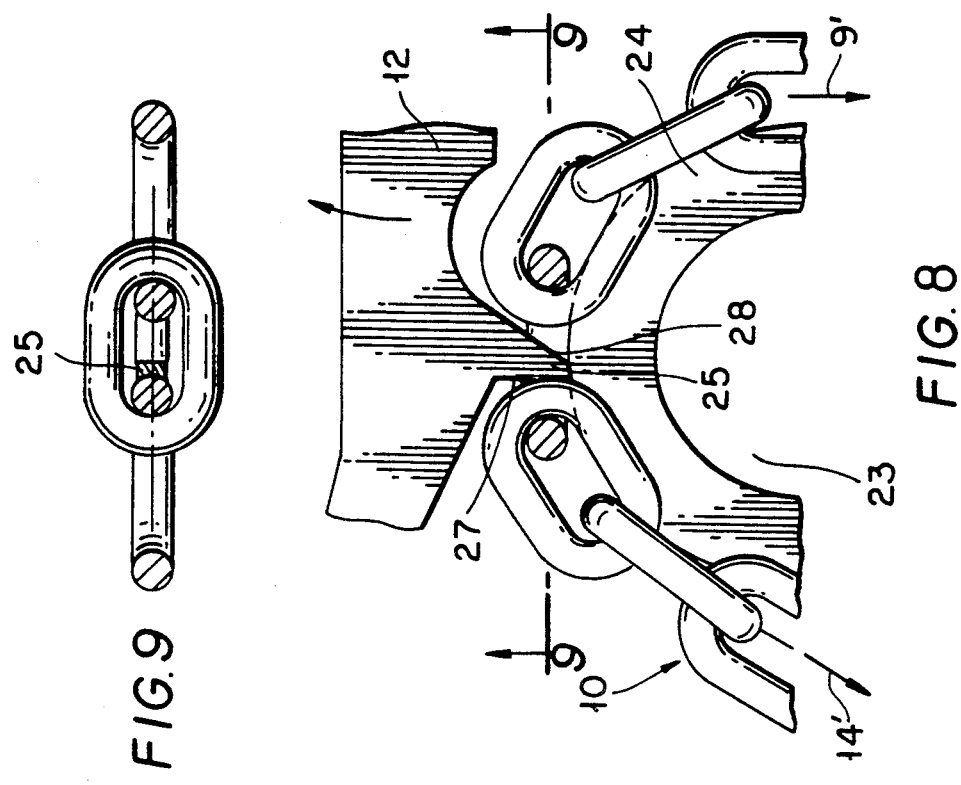
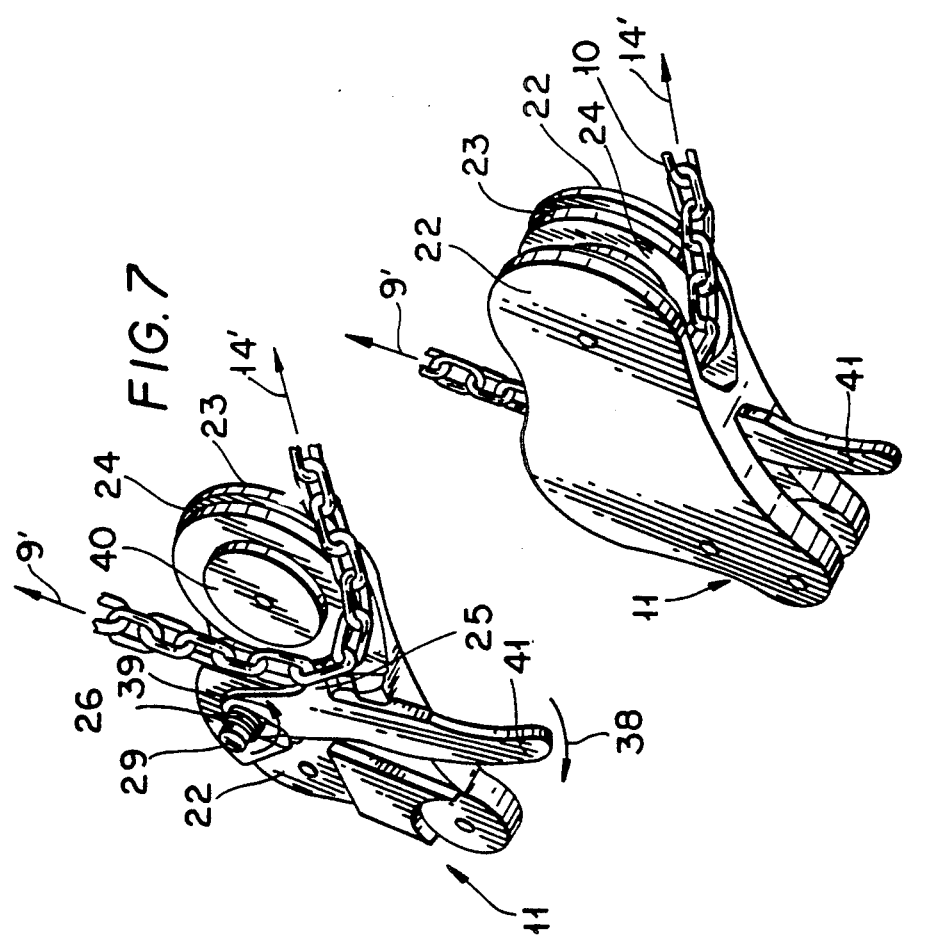

ANTI-SKID CHAIN FOR VEHICLE TIRES

FIELD OF THE INVENTION

The invention relates to an anti-skid chain for vehicle tires. In particular, the invention relates to an anti-skid chain which comprises an inner side harness and an outer side harness which are joined together by chain line sections which extend between the inner and outer harness. In use, the inner side harness rests against the inner side wall of the vehicle tire, while the outer side harness rests against the outer side wall of the vehicle tire. The chain line sections extend across the tread of the tire.

BACKGROUND TO THE INVENTION

Anti-skid chains are usually carried unassembled in a vehicle. The anti-skid chains are only assembled and fitted to the vehicle wheels when required as a result of road conditions. The assembly and fitting, in general, takes place under conditions which are unpleasant for the user. For this reason, efforts have been made to provide anti-skid chains which can be quickly fitted to a vehicle wheel, and, in particular, can be fitted to a vehicle wheel in a relatively uncomplicated manner, so that, even in unfavorable weather conditions, an unpracticed user may assemble and fit the anti-skid chains without undue handling problems.

Many suggestions have been made in the past for providing an anti-skid chain which is more easily assembled and fitted to a vehicle wheel. Indeed, significant advances have been made in anti-skid chains in the last few years.

In known anti-skid chains, the outer side harness commonly comprises a harness line having at least one intermediately disposed elastic expansion member. One end of the harness line is connected to a locking device and the other end of the harness line is connected to a tensioning chain which passes through the locking device. A releasable locking element in the locking device releasably locks the tensioning chain in a direction opposite to the direction to which the tension force is applied to the tensioning chain for tensioning the harness line. In other words, the releasable locking element permits the tensioning chain to move freely in the direction it is pulled to apply tension to the harness line but prevents movement of the tensioning chain in the opposite direction.

In a particular known construction of anti-skid chain, the inner harness of the chain comprises an elastically expandable spring steel stirrup. A tensioning chain is secured to one free end of the stirrup which passes through a diversion eye on the other free end of the spring steel stirrup. The tenioning chain is then led from the diversion eye transversely across the tire tread to the outer side wall of the tire where its free end is suitably retained by hooking the free end to the outer side harness. The inner side harness of this known anti-skid chain may be relatively quickly assembled and fitted to the inner side of the vehicle tire by the user working from the outer side of the vehicle wheel. Besides the tensioning of the inner side harness, however, the outer side harness must likewise be tensioned in order to achieve a secure seating of the chain upon the wheel. However, in this known anti-skid chain, a once-and-for-all assembly and fitting of the chain is not possible. The chain, on being secured to the vehicle tire, must be tightened again after each journey, even if the journey is relatively short.

In another known anti-skid chain, the inner lateral harness similarly consists of a construction which can be spread apart so that it clears the tread of the vehicle. In this construction, the inner side harness comprises three or four rigid curved metal links pivotally secured to each other at their ends. The links are biased under spring forces into a closed annular shape. Closure members are mounted respectively on the two free ends of the end links. The closure members are arranged on the inner side harness so that they engage each other as the free ends of the harness come together after the expanded harness has been skipped over the tire tread and released, thereby automatically closing and locking the harness into an annular shape. A particularly rapid assembly is possible in this known anti-skid chain, since the user does not have to tighten the inner side harness from the outer side of the wheel. However, the outer side harness does have to be tightened by the user in this case.

The basic consideration, apart from rapid assembly and fitting, of an anti-skid chain onto a vehicle tire is that it is important that the chain when seated on a vehicle wheel should be well tensioned. This is necessary to ensure that the anti-skid chain functions properly. For an anti-skid chain to have good functioning properties in use, not only the static stresses but also the dynamic stresses of the chain which arise during use must be equilibrated as much as possible so that good chain seating on the tire can be maintained during use, even in the presence of the most varied stresses. Further, at the same time, the running noises of the chain which are strongly influenced by the dynamic behaviour of the chain should be held as low as possible.

It is known to provide one or more elastic expansion members in the outer side harness for tensioning the chain. The elastic expansion members are themselves tightened when the chain is tightened, and as a result of the elastic restoring force thereby generated ensure that the chain always remains tensioned on the tire even during use. This is important since, in use, alteration in the fit of the chain on the tire can arise as a result of the dynamic forces on the chain during use. This can lead to relaxation of the outer side harness.

Instead of expansion members, it is also known to use a locking device through which a tensioning chain attached to one end of the outer side harness is guided. The locking device prevents the tensioning chain (and with it the side harness which is secured to it) from running back against the direction of the tensioning force after the outer side harness has been tightened.

It is a known fact that for a considerable time now the demands which are made on modern anti-skid chains as regards the functioning properties of the chain in use and the speed with which the chain may be assembled and fitted to a vehicle tire have led to a compromise in favor of one or other of the required properties. Thus, chains with particularly good functioning properties do not lend themselves to easy and quick assembly and fitting onto a vehicle tire and vice versa.

Italian Utility Model No. 210268 discloses an anti-skid chain of the type discussed above having a tensioning arrangement for the outer side harness. The outer side harness comprises a harness line having intermediately disposed elasticity, as well as an anti-reversing locking device for a tensioning chain. In this known anti-skid chain, however, the inner side harness comprises a strong wire rope, which during assembly is first fitted to the inner side of the vehicle wheel and must have one of its ends brought around said wheel until said end once again reaches the outer side of the wheel at the other end of the vehicle wheel. It is then necessary to secure the two free ends of the wire rope to each other by a closure means which is not simple for an inexperienced user to operate. It is then necessary for the user, in order to bring the wire rope to the inner side of the vehicle wheel to form a side harness, to grasp the wire rope, closed after the securing of its ends, with both hands laterally, to pull it into an oval elongated form and to bring it upwards on the vehicle wheel, and finally to bring the upper and outer part of the wire rope across the upper tread of the vehicle tire as far as the rear side of the vehicle wheel. The assembly and tightening of the outer side harness can only be undertaken when this very awkward handling procedure of the inner side harness has been completed. In this device, the outer side harness comprises a harness line formed by a chain which has two individual sections, whose ends must be hooked together to finally produce the entire tensioning line. This hooking together of the two sections of the outer side harness can only be undertaken after the inner side harness has been brought to the inner side of the vehicle wheel. This also applies to the threading of the tensioning line through the locking device. The reason for this is that the tensioning chain must be pulled out of the locking device before the inner harness has been brought across the vehicle wheel in order to permit said transition of the inner harness. In this known anti-skid chain the tensioning chain is secured at one end of the harness line while the locking device is resiliently mounted on the other end of the harness line by a screw adjusted tension spring. The locking device comprises a releasable locking element which can be brought into engagement with the tensioning chain when the tensioning chain passes through the locking device.

While this anti-skid chain possesses good functioning properties as a result of the combination of expansion elements and tightening elements on the outer side harness, as well as by its overall construction, it is very tedious and relatively slow to assemble to a vehicle tire. For this purpose, the connections on the ends of the inner side harness and of the two sections of the harness line of the outer side harness must be released and the tensioning chain must also be released from the locking device. Only then can the wire rope of the inner side harness be pushed around the vehicle wheel, until it once more reaches the front, after which the said connections must be re-established once more in predetermined sequence steps. As previously mentioned, it is also necessary that the tensioning chain be drawn out of the locking device before assembly. And furthermore, for completion of assembly, the tensioning chain must once again be threaded through the locking device before tightening of the outer side harness can take place. A substantial amount of manual dexterity is necessary and a large number of manipulations that have to be performed cannot be done at all with, for example, bulky gloves such as fur-lined gloves or the like. In addition, the establishment of the said connections is almost impossible in unfavourable lighting conditions without the use of an additional light source. In order to avoid excessive strain on the expansion members caused by excessive pulling of the free end of the tensioning chain, there is applied in the interior of spiral springs which form the expansion members a chin section which hangs loosely in the relaxed condition of the spiral springs, and which only permits extension of the spiral springs up to a predetermined limit. If the expansion members, however, are not tensioned to their load limit, undesirable noise can develop inside each spiral spring through the relaxed chain section present within the spring. Apart from that, undesired vibrations may arise as a result of the dynamic stresses induced in the chains during driving because of the spiral springs used. These vibrations also intensify the running noise of the anti-skid chain. Furthermore, the spiral springs lie against the outer side wall of the vehicle tire which can give rise to undesirable abrasion of the tire.

OBJECT OF THE INVENTION

The object of the invention is to provide an anti-skid chain of relatively simple construction which can be relatively easily and rapidly assembled and fitted to a vehicle tire without adversely impairing the functioning properties of the chain.

SUMMARY AND ADVANTAGES OF THE INVENTION

According to the invention, there is provided an anti-skid chain for a vehicle tire comprising an outer side harness having a harness line extending between two ends, at least one elastic expansion member being provided in the harness line, at least one of the expansion members acting as a damper, a locking means being connected to one end of the harness line, a tensioning chain for tensioning the harness line, the tensioning chain being connected to the other end of the harness line, and passing through the locking means for closing the harness line, a releasable locking element mounted in the locking means for releasably locking the tensioning chain in the locking means in a direction opposite to a direction in which a tensioning force is applied to the tensioning chain for tensioning the harness line, stop means provided in the tensioning chain to prevent disengagement of the tensioning chain from the locking means, an inner side harness comprising an open ring-shaped resilient stirrup having two free ends biased towards each other to a closed position, the stirrup being elastically openable to an open position with the free ends spaced apart to slip over the tire tread, closure members mounted on the respective ends of the stirrup, the closure members being lockable together by bringing the ends of the stirrup towards each other to the closed position, and chain line sections connected to the inner and outer side harnesses to, in use, extend over the tire tread.

Because the inner side harness is a ring-shaped elastically spreadable resilient stirrup with closure members on its ends which come into lockable engagement as the ends of the stirrup approach each other, the inner side harness can be rapidly assembled and fitted to a vehicle wheel, and tightening of the side harness is therefore not necessary. Further, the resilient stirrup forms a particularly stable inner side harness which is important for good seating of the anti-skid chain on the tire and also for good performance of the anti-skid chain during travel. In the anti-skid chain according to the invention, the harness line of the outer side harness being formed as a single line permits relative ease of assembly and fitting of the chain to the vehicle tire. This is unlike the difficulties experienced in fitting prior art anti-skid chains in which the outer side harness is formed from two separate sections which must be separated prior to assembly and then subsequently assembled together in order to fit the devices to a vehicle tire. In fact, in the case of the present invention, the outer side harness is formed by a through-going, uninterrupted harness line which cannot be dismantled or separated into parts, and furthermore which also comprises an elastic expansion member or members at least one of which forms a damping element.

Furthermore, by virtue of the fact that the tensioning chain which is connected to the harness line passes through the locking means which is also connected to the harness line of the outer side harness, and the tensioning chain is provided with a stop means which prevents disengagement of the tensioning chain from the locking means, the tensioning chain never disengages the locking means, and therefore there is no need for the awkward and difficult operation of the threading the tensioning chain through the locking means which is a problem with prior art anti-skid chains. Further, the tensioning chain is of such a length that it permits the outer side harness to be expanded, thereby avoiding any restriction on the opening of the resilient stirrup of the inner side harness for the purposes of slipping it over the vehicle tire.

During assembly and fitting of the anti-skid chain according to the invention, as already described, the resilient stirrup is first spread apart and then slipped over the tire and released. The closure members lock, preferably automatically, when the free ends of the resilient stirrup move towards each other on being released. As already discussed, the free ends of the stirrup move towards each other on being released due to the inherent resilience of the stirrup. On the other hand, if when the free ends of the stirrup were spread apart, the stirrup was not spread apart sufficiently to induce a sufficient biasing or restoring force into the stirrup to bring the closed ends together on release of the stirrup, the ends may be moved together the last increment by hand in order to lock the closure members.

Thus, once the inner side harness has been secured as just described, only the tensioning chain needs to be pulled through the locking means for tightening the outer harness line, including the expansion members, so that the outer harness sits tautly on the tire and remains in position during travel of the vehicle. This is a result of the fact that the expansion members are stressed and are retained in the stressed state by the one-way action of the locking element of the locking means. The free end of the tensioning chain which is pulled out through the locking means is desirably secured to the outer side harness, and where a tightening member which acts as a damping element is provided in the tensioning chain of the anti-skid chain according to the invention, the tensioning chain remains secured in position, and a good seating of the tensioning chain is achieved.

In the anti-skid chain according to the invention, no connection has to be made between any section of the harness line of the outer side harness, nor does the end of the tensioning chain have to be threaded into the locking means. Furthermore, the user has to make only a few simple manipulations for closing the inner side harness which is formed by the resilient stirrup even when closure of the closure members is not automatic. The anti-skid chain according to the invention can be assembled by a user in unfavourable weather conditions, for example in the coldest weather, even when the user is wearing padded gloves or mittens, without having to take them off. Further, even in darkness or in unfavorable lighting conditions, where the user is having difficulty in recognizing individual parts of the anti-skid chain, the parts of the anti-skid chain can readily easily be identified by touch. Further, by feeling the resistance to movement in the tensioning chain, the user can identify when the tensioning chain has been fully pulled through the locking means.

Releasing the anti-skid chain according to the invention is also relatively simple and easy, and is considerably more simple and easy than releasing anti-skid chains known heretofore.

Apart from being significantly easier and faster to assemble onto a vehicle tire, the anti-skid chain according to the invention has a considerably more simplified construction than anti-skid chains known heretofore.

Over and above all these advantages, the anti-skid chain according to the invention has considerably improved functioning properties, particularly with regard to dynamic forces resulting from the vehicle travelling. By virtue of the fact that the elastic expansion members simultaneously act as damping elements, a particularly balanced uptake of forces in the anti-skid chain is achieved which results in the anti-skid chain remaining securely seated on the tire. This is also the case even when the anti-skid chain is subjected to relatively large fluctuations in the value of the loads induced in the anti-skid chain, and where such fluctuations act in quick succession. These damping elements furthermore reduces running noise in the chain, and furthermore prevents or at least reduces undesired vibrations, especially in the outer side harness line. The use of the resilient stirrup as an inner side harness further facilitates the reduction of noise an vibrations. This it has been found is because the inner side harness is a relatively large stiff unit which is mounted on the inner side of the vehicle wheel, and thus as well as contributing to the seating of the anti-skid chains on the vehicle wheel, also reduces undesired vibrations in the assembled chain.

The anti-skid chain according to the invention has excellent functioning properties and furthermore, makes possible a relatively easy and rapid assembly; it sits well and can always be held in a taut condition not only while the vehicle is stationary, but also during use when the chain is subjected to dynamic loading. The chain takes up elastically (in damped fashion) the impulses of the stresses which are transmitted from the chain line sections extending over the tire tread in use. At the same time, the anti-skid chain according to the invention has a certain tolerance range which allows the use of the chains even on tires of different sizes.

According to a preferred embodiment of the invention, each closure member comprises a flat plate extending substantially in a plane of the stirrup, a hooking tab is provided on each plate and is formed by bending a tab out of the plate plane, the tab of each closure member extends from the plate in a direction substantially opposite to the direction of closing of the stirrup, each plate has an opening adjacent the hooking tab, the opening is engagable with the hooking tab of the other closure member when the stirrup is in the closed position, the hooking tab projects from the plate of each closure member on the same side of the stirrup and is disposed on each plate in a position forward of the opening in the direction of closing of the stirrup.

Preferably, each closure member is a mirror image of the other closure member.

In these embodiments of the invention, the plate-like closure members each lie in the plane of the resilient stirrup, and the hooking tabs are bent out of the plane. The effect of this is that each of the hooking tabs is in a position to divert the plane of the other closure member to one side until the hooking tab aligns with the opening in the said plate, at which stage the hooking tab engages the opening and locks the closure members together. The preferred closure members, on account of their particularly flat and relatively small construction, have the advantage of remaining substantially flush with the stirrup against the vehicle tire. Thus, damage resulting from abrasion or the like to the vehicle tire is avoided.

Since the openings are preferably formed by pressing, ice which may have collected in the opening can readily easily be pressed out without difficulty by unhooking the hooking member when the anti-skid chain of the invention is being taken off. Thus, removal of the chain is possible, even when iced up.

In a further preferred embodiment of the anti-skid chain according to the invention, the locking means comprises a housing having a chain guide groove for receiving links of the tensioning chain, the links of the tensioning chain lying alternately on two side edges of the chain guide groove or travelling perpendicularly thereto in the chain guide groove, the locking element comprising a latch pivotally mounted in the housing of the locking means, the latch being directed and biased towards the chain guide groove and being shaped to permit passage of the tensioning chain through the chain guide groove when the tensioning chain is pulled in the direction for tensioning the harness line, and to lock the tensioning chain in the chain guide groove to prevent passage of the chain through the chain guide groove in the opposite direction.

Preferably, the chain guide groove is curved so that the tensioning chain extending from the harness line runs onto the chain guide groove substantially tangentially and the other portion of the tensioning chain extending from the chain guide groove runs tangentially from the chain guide groove towards the center of the vehicle tire. The advantage of this feature of the invention is that the tensioning chain can be led out of the locking means in such a direction that when the tensioning chain is pulled, disengagement of the chain from the chain guide groove is avoided.

In a further preferred embodiment of the invention, a roller is rotatably mounted in the housing of the locking means, the chain guide groove being formed around the periphery of the roller.

In another preferred embodiment of the invention, an elongated rocking lever is provided in the locking means, the latch extending from the rocking lever intermediate the ends thereof, one end of the rocking lever being pivotally mounted in the housing of the locking means, and the other end of the rocking lever extending from the housing to form an actuating handle, the rocking lever being biased for biasing the latch towards the chain guide groove. Preferably, the rocking lever is pivotally mounted on a stub axle mounted in the housing of the rocking means, and is biased by an end of a biasing spring wound round the stub axle. Advantageously, a stop member is provided in the housing of the locking means to abut the rocking lever.

By suitable choice of the length of the free end of the rocking lever, namely, the actuating handle, the releasing force necessary for an effortless release of the latch from the tensioning chain can be determined, even if the locking means should be iced up.

In another embodiment of the invention, the portion of the locking means forming the chain guide groove is of a plastic material.

While the housing of the locking means can be of any suitable material, it is preferable that it be manufactured from a suitable plastic material similar to the material of the portion which comprises the chain guide groove. In this way, frictional forces between the tensioning chain and the chain guide groove can be kept relatively low. Indeed, the entire locking means can be designed as a relatively flat, small part, and in this way can be easily accommodated on one side of the vehicle wheel without significant space requirement, and furthermore can lie against a side wall of the tire without causing any damage to the tire.

The locking means according to the invention is a relatively simple, robust and effective locking means. It is also easy to service. Indeed, this is true whether the locking means is used in connection with the anti-skid chain in accordance with the invention or not. Other alternative constructions of stop means for preventing the tensioning chain disengaging the locking means can be used. A particularly preferred construction of stop means is a stop member mounted at the end of the tensioning chain, in such a way that when the tensioning chain is pulled through the locking device as far as its free end, the stop member on the end of the chain comes into engagement with a corresponding counterformation in the housing of the locking means. In this way, desired locking is achieved and the tensioning chain is prevented from running completely through the locking means.

This stop member on one end of the tensioning chain is particularly preferred in the form of a handle which always remains outside the locking means and can thus be easily grasped by the user in order to tighten the tensioning chain which is possible even when the user may be wearing thick gloves.

In another preferred embodiment of the invention, the stop member comprises an elastically expandable tightening member terminating in a securing element for hooking onto the outer side harness. Preferably, the securing element is a hook.

In this way, an elastically extendible tightening member which itself undergoes a certain elastic extension in the hands of the person who is tightening the tensioning chain is provided.

It is of course possible to form the tightening member for example in the form of a spiral tension spring.

According to a particularly preferred embodiment of the invention, the tightening member acts as a damping element. This counteracts any vibrations which are generated in the tensioning chain resulting from the dynamic stresses caused by travel of the vehicle. Such stresses would be of the type which could eventually cause the hooks at the end of the tightening member to disengage from its hooked in position.

In a preferred embodiment of the invention, the damping element is constructed of a plastic material or vulcanized rubber, for example of the type which exhibits suitable damping characteristics as a result of its inherent hysteresis. The tightening member which forms the handle may be rigidly connected to the end of the tensioning chain, but is preferably secured in a swivelable manner to the end of the tensioning chain.

This further simplifies the insertion of the securing member which is preferably provided by a hook into the outer side harness.

In a further advantageous embodiment of the invention, the anti-skid chain comprises at least one diverting element mounted on the outer side harness, and directed towards the centre of the vehicle tire, in use, for diverting the tensioning chain to a region opposite the locking means. This diverting element is attached to the outer side harness and is directed towards the center of the tire. The tensioning chain on being pulled through the locking means is then looped over the diverting element which diverts the tensioning chain to the opposite side of the outer side harness line where it is hooked onto the harness line. The diverting element, thus, accommodates a relatively long tensioning chain, and as can be seen, a tensioning chain of substantially twice the length which could otherwise be accommodated. By virtue of the fact that the diverting element is preferably directed towards the center of the vehicle tire, interference with other chains is avoided.

The elastic expansion members which also act as dampers and are mounted on the outer side harness may be manufactured from any suitable material. Particularly preferred materials are damping plastic materials with sufficient resilient properties, or alternatively vulcanized rubber. The preferred vulcanized rubber types are those which substantially retain their elastic extension properties even at low temperatures, and preferably those down to −50° C.

In a further preferred embodiment of the invention, the expansion members and damping elements comprise expandable sections or strip like sections, to the ends of which respective securing elements are attached. The securing elements can be provided, preferably as hooks or eyes, for connection to the adjacent chain link of the associated harness line. A strip-like section and damping element of this type not only has the advantage it is relatively flat, but also lends itself to a great degree of constructional freedom in its design.

It is of course possible to secure the securing elements at the ends of the strip-like section by any suitable means. A particularly simple, long-lasting and especially reliable securing arrangement consists of securing the securing elements into the strip-shaped elements by adhesive, and preferably a rubber chlorohydrate based adhesive.

On account of their damping properties, it is essentially unnecessary to limit the extension of the resilient damping elements to the degree which is necessary, for example, in spiral springs, when such springs are interposed as elastic elements in a side chain. According to a preferred embodiment of the invention, however, a limitation of resilient extension is provided for the damping elements used in accordance with the invention, in order to prevent over-extension of the damping elements under exteremely strong tension. This is accomplished in a particularly preferable way, in that the damping element is mounted in a closed housing. The securing elements extend through the walls of the housing, and at least one of the securing elements, and preferably both, are mounted to be freely movable in a longitudinal direction in the direction of expansion and contraction of the damping element. This closed housing, which preferably is formed of a thermo-plastic material, protects the damping element in it, and is resistant to low temperatures and restricts the expansion of the damping element. This is caused by the fact that the end walls of the housing constitute limit means which limit the extension of the expansion and damping element.

It is also possible to introduce relatively large openings in the end walls of the housing to accommodate the securing elements of the damping elements. An especially preferred arrangement, however, is to provide each securing element as a shaft which extend in the direction of extension and contraction of the damping element, and which passes through openings in the ends walls of the housing, which is so dimensioned as to provide clearance for the shaft of the securing element. Preferably, the clearance is such as to permit the shaft freely to move in a longitudinal direction, in other words, in the direction of expansion and contraction but to restrict lateral play. Thus, dirt and moisture are largely prevented from penetrating into the housing and in this way the formation of ice within the housing is avoided. It is particularly preferred that the housing should be formed in two half shells securely fixed together, whereby a simple, speedy and economic assembly is possible.

The invention will be more clearly understood from the following description of a preferred embodiment thereof, which is given by way of example only, with reference to the accompanying drawings.

BRIEF DESCRIPTION OF THE DRAWINGS

FIG. 3 is an enlarged perspective view of a pair of closure members for use in the portion of the anti-skid chain illustrated in FIG. 2 in an open condition, FIG. 4 is an enlarged perspective view of the closure members of FIG. 3 illustrated in the closed position, FIG. 5 is a perspective view of a tightening member for use in the anti-skid chain of FIG. 1, FIG. 6 is a perspective view of a locking device for use in the anti-skid chain of FIG. 1, FIG. 7 is a perspective view of the locking device of FIG. 6 with a side wall of the device removed, FIG. 8 is a schematic representation of portion of the locking device of FIG. 6 in use, FIG. 9 is a cross sectional view on the line XI—XI of the portion of the locking device in FIG. 8, FIG. 10 is an enlarged perspective view of an elastically expandable expansion member with portion of the member removed.

DETAILED DESCRIPTION OF THE INVENTION

Figure 1:
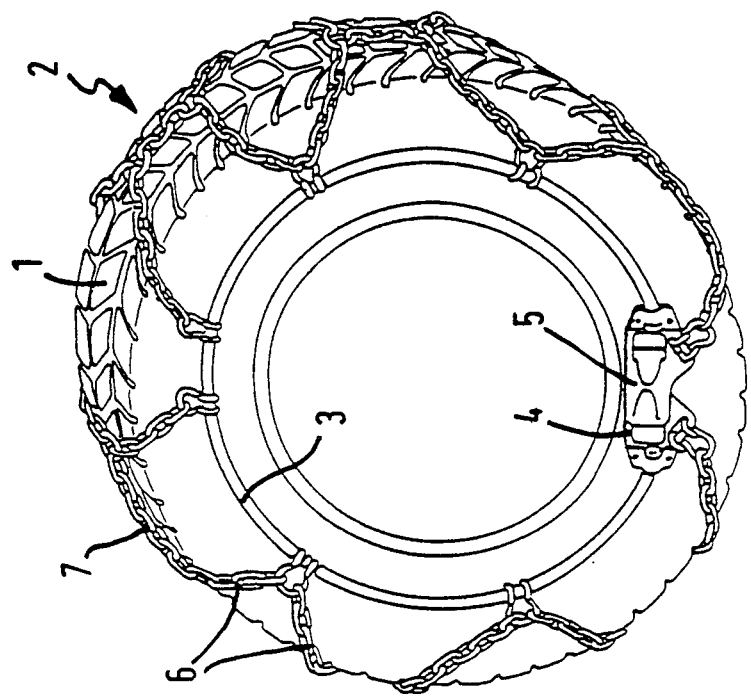
FIG. 1 is a perspective view of an anti-skid chain according to the invention fitted to a vehicle tire illustrated from the outer side of the vehicle tire.
Figure 2:
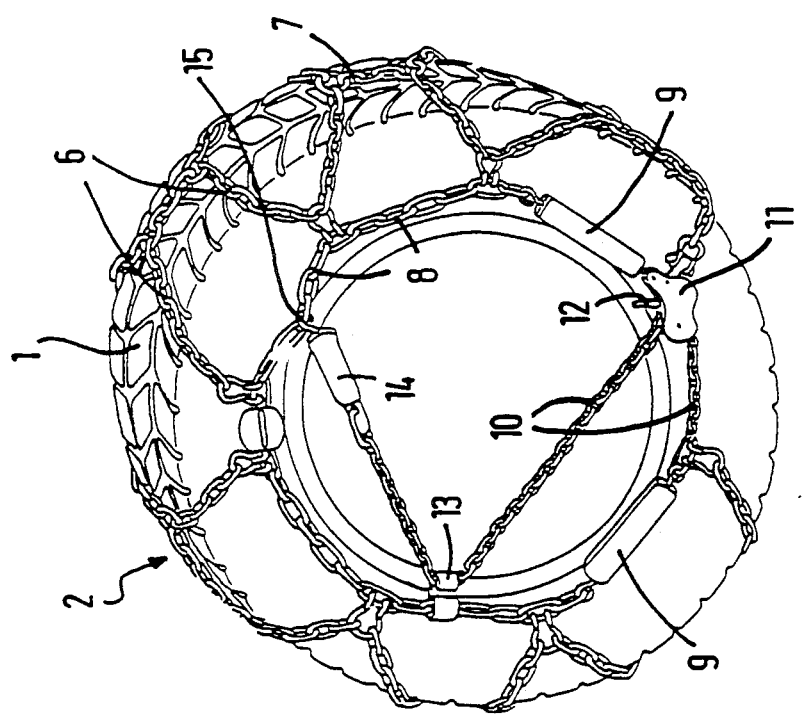
FIG. 2 is a perspective view of the anti-skid chain of FIG. 1 illustrated from the inner side of the vehicle tire.

Referring to FIGS. 1 and 2, an anti-skid chain according to the invention indicated generally by the reference numeral 2 is illustrated mounted on a vehicle tire 1 which is in turn mounted on a vehicle wheel rim. The anti-skid chain 2 comprises an inner side harness which comprises an open ring shaped resilient stirrup, namely a spring steel stirrup 3, see FIG. 2. The stirrup 3 is elastically openable with its free ends spaced apart to slip over the tire tread and is illustrated in the closed position in FIG. 2 forming a closed circular ring with its free end adjacent each other.

Closure members 4, 5 are secured to the respective free ends of the spring steel stirrup 3. Each closure member 4, 5 is formed from a flat, plate-like pressed part, see FIGS. 2, 3 and 4. The two pressed parts 4, 5 are formed and shaped to be mirror images of each other and are correspondingly mounted on the ends of the spring steel stirrup 3. The closure members 4, 5 are described in more detail below with reference to FIGS. 3 and 4.

Chain line sections 6 extend over the tread of the tire 1 and are secured to the spring steel stirrup 3. Connecting sections 7 extending between the chain line section 6 in use are located on the tread of the tire, and with the chain line sections 6 make up the working network of the anti-skid chain 2.

For assembly purposes, the spring steel stirrup 3 is first grasped by the user in the region of its two free ends which are spread apart against the inherent resilience of the stirrup 3 so that the stirrup 3 can be slipped over the tread of the tire 1. The spring steel stirrup 3 is then released by the user and under its own resilience springs back elastically into its closed condition illustrated in FIG. 2, whereby its ends advance towards one another, thus bringing the closure members 4, 5 into mutual engagement whereby they lock together. The spring steel stirrup 3 then takes up the position shown in FIG. 2. If the resilience, namely the spring pretensioning of the spring steel stirrup 3 when in its spread apart condition is not quite sufficient to bring the two free ends of the stirrup close enough together for the closure members 4, 5 to automatically hook into one another, the user need only move the two free ends of the stirrup 3 together by hand the small remaining distance for mutual engagement and locking of the closure members 4, 5. For demounting the anti-skid chain, a user on the outer side of the vehicle wheel grasps the free ends of the stirrup 3 by hand by extending his hands around to the inner side of the tire 1 and after releasing the mutually engaged closure members 4, 5 the free ends of the stirrup 3 are spread apart on the inner side of the tire to permit the stirrup to be slipped over the tire 1 to the outer side of the tire. In this operation, the closure members 4, 5 move apart from one another without being obstructed by the chain sections of the working network 6, 7.

The chain line sections 6 extend from the spring steel stirrup 3 across the tire tread and are attached to an outer side harness formed by a closed harness line provided by a harness chain 8. The free ends of the harness chain 8 are secured to respective expansion members 9. Such an expansion member 9 is described below in greater detail with reference to FIG. 10.

One expansion member 9 is secured to a tensioning chain 10 and the other expansion member 9 is connected to a locking means in this case provided by a one way locking device 11. The tensioning chain 10 passes through the locking device 11, which is described in more detail below with reference to FIGS. 6 to 9. A locking element 12 is mounted in the locking device and releasably engages the tensioning chain 10. The locking element 12 permits the tensioning chain 10 to be freely pulled through the locking device 11 in the direction to which a tensioning force is applied to the tensioning chain to tension the harness chain 8, namely, in the direction which ensures that the spacing between the two expansion members 9 is reduced, while preventing movement of the tensioning chain 10 through the locking device 11 in the opposite direction. Releasing the locking element 12 from the tensioning chain 10 as will be described below permits free movement of the tensioning chain 10 in both directions through the locking device 11.

The tensioning chain 10 is led through a diverting element provided by a diverting hook 13 which is secured to the outer harness chain 8 and which points towards the center of the tire. From the diverting hook 13, the end region of the tensioning chain 10 is directed to an approximately opposite position of the harness chain 8 and is releasably hooked to the harness chain 8 by a hook 15. The hook 15 is secured to the free end of an elastically expandable tightening member 14. The tightening member 14 is swivelably mounted on the free end of the tensioning chain 10. The tightening member 14 is described with reference to FIG. 5 in greater detail below.

As can be seen from FIG. 1, the harness chain 8, the two expansion members 9, the section of the tensioning chain 10 which unites them as well as the locking device 11 form an approximately circular, ring-shaped circumferential, completely closed, uninterrupted line which forms the outer side harness of the anti-skid chain 2.

The tightening member 14 is so shaped relative to the locking device 11 that the tightening member 14 and locking device 11 co-operate with each other to prevent the tensioning chain 10 being pulled through the locking device 11, even when the locking element 12 is disengaged from the tensioning chain 10. In other words, the dimensions of the tightening member 14 are such that the tightening member 14 acts as a stop means to prevent the tensioning member 14 being pulled through the locking device 11. Thus, the closed line formed by the harness chain 8, the two expansion members 9, the section of the tensioning chain 10 which unites the expansion member 9 and the locking member 11 cannot be opened. The length of the tensioning chain 10 is such that when the tensioning chain is pulled through the locking device 11 and the tightening member 14 is abutting the locking member 11, the ends of the spring steel stirrup 3 may be spread apart a relatively large distance so that the spacing between the closure members 4, 5 is such that the stirrup 3 can be slipped unimpeded over the tire 1 from the outer side to the inner side of the tire 1. When the stirrup 3 is at the inner side of the tire 1, by releasing the stirrup 3, the stirrup 3 springs back to its closed relaxed position forming a hoop, thereby bringing the closure members 4 and 5 into mutual engagement as illustrated in FIGS. 2 and 4.

After that the tightening member 14, projecting from the locking device 11, is grasped by the user and pulled, thereby pulling the tensioning chain 10 in the tensioning direction through the locking device 11 until a sufficiently large resistance is felt. In this condition, the expansion members 9 are more or less strongly expanded, the outer side harness takes up the position shown in FIG. 1, and the locking element 12 prevents the tensioning chain 10 running back through the locking device 11. In other words, an undesired relaxation of the tensioning chain 10 is prevented.

After this, the free end of the tensioning chain is brought around the diverting hook 13 and the hook 15 is stretched onto the harness chain 8 as illustrated in FIG. 1, thereby expanding the tightening member 14 so that the tensioning chain 10 is lightly tensioned in order to prevent inadvertent release thereof.

The expansion members 9 ensure that the anti-skid chain 2 always sits securely and tautly on the tire 1 during travel of the vehicle, and furthermore, the expansion members 9 ensure that all dynamic stresses which arise during travel of the vehicle and which would otherwise lead to alterations in the location of the chain line section 6, 7 on the tire tread are uniformly absorbed and compensated for.

As can be seen, all that is need for assembly of the anti-skid chain 2 on the tire 1 is a few relatively simple manipulations which require no skill and can easily be performed in relatively bad lighting conditions, or indeed in the dark.

FIG. 3 illustrates the two closure members 4, 5 which are of similar construction but are mirror images of each other and are secured to the respective opposed ends of the spring steel stirrup 3. When the spring steel stirrup 3 is spread apart to the open position by the user creating a resilient restoring force, the closure members 4, 5 are moved into spaced apart relationship such as illustrated in FIG. 3. When the spring steel stirrup 3 is released and springs back to its initial relaxed closed position, the two closure members 4, 5 are moved towards each other in the direction of the arrows shown in FIG. 3. Each of the closure members 4, 5 is formed of plate material, for example, each closure member 4, 5 is stamped out of 2 mm sheet steel. Two rivet holes 16 are provided at the ends of the closure members 4, 5 which face the associated end of the spring steel stirrup 3. Rivets through the holes 16 engage the ends of the stirrup 3 and a counter piece (not shown) which embraces the end of the spring steel stirrup 3 in a clamping manner. An opening 17 is provided in the mid-region of each closure member 4, 5. A hooking tab 18 is provided adjacent the free end of each closure member 4, 5, and each hooking tab 18 is formed by pressing and bending a tab in a suitable manner from the sheet metal of the plate. Each hooking tab 18 is directed from the plate forming its closure member 4, 5 in a direction opposite to the direction of closure of the stirrup so that it constitutes a closure hook to retain the free ends of the stirrup 3 together and prevent them from being spread apart. Each hooking tab 18 extends obliquely outwardly from the surface the closure member near the free end thereof and towards the opening 17. In other words, the hooking tab 18 extends from the side of the closure member which is not intended to be adjacent the side wall of the tire in use. Each hooking tab 18 is angled off parallel to the surface of the closure member 4, 5 and extends parallel to the tensioning plane of the closure member 4, 5 in the direction of the opening 17 and tapers towards its free end. The spacing between the end section of the hooking tab 18 and the surface of the closure member 4, 5 is not substantially greater than the thickness of the sheet metal forming the closure members. Furthermore, the width of the section of the tab 18 that stands away from the surface is just slightly less than the width of the opening 17. The hooking tabs 18 of both closure members 4, 5 project to the same side and lie together with the openings 17 flush with a line of the spring movement (arrows). The closure members 4, 5 lie in a plane defined by the spring steel stirrups 3 as can be seen in FIG. 2, and can hook one onto the other independently of which of the two closure members 4, 5 lie in front or behind the other.

FIG. 4 illustrates the two closure members 4, 5 mutually engaged together. In other words, the hooked tab 18 of one closure member engages in the opening 17 of the other closure member. The closure members 4, 5 as already discussed engage each other as illustrated in FIG. 4, when the stirrup 3 has sprung back into its closed relaxed ring-shaped initial position (after having been previously spread apart), or is brought into its relaxed ring-shaped initial closed position by hand.

An opening 19 for securing a respective chain line 6 which extends over the tire tread is provided in each closure member 4, 5 adjacent an edge thereof.

Turning now to FIG. 5, the tightening member 14 mounted on the end of the tensioning chain 10 is illustrated. The tightening member 14 comprises an elastic expansion mid-section 21 formed of a vulcanized rubber which remains sufficiently supple and elastic at a temperature down to −50° C. The mid-section 21 simultaneously acts as a damping element which can easily be stretched by hand and is so dimensionsed that it can be used as a hand grip for pulling the tensioning chain 10 through the locking device 11.

An end plate 20 is secured in the end of the mid-section 21 directed towards the tensioning chain 10. Only the last link 10a of the tensioning chain 10 is illustrated in FIG. 5. A transverse bore is provided in the end plate 20 for receiving the last link 10a of the tensioning chain 10. Accordingly, the tensioning chain is swiveably connected to the tightening member 14, thereby permitting the tightening member 14 to be used as a hand grip for pulling the tensioning chain 10. The hook 15 is secured to the other end of the mid-section 21 so that the tightening member 14 can be hooked onto the harness chain 8 after tightening the tensioning chain 10, see FIG. 1.

Referring now to FIGS. 6 and 7, the locking device 11 is illustrated with the tensioning chain 10 passing therethrough. The locking device 11 comprises a housing formed by a pair of spaced apart side plates 22 of plastic material. The locking device 11 is illustrated in FIG. 7 with the side plate 22 which faces the observer removed, so as to illustrate the interior of the locking device 11. The side plates 22 support a transverse stub axle 40 which rotatably carries a roller 23 between the side plates 22. A chain guide groove 24 for receiving the tensioning chain 10 is formed on the outer periphery of the roller 23. FIGS. 8 and 9 illustrate in detail the cooperation between the tensioning chain 10 and the chain guide groove 24.

The tensioning chain 10 travels over the roller 23 through the chain guide groove 24. As can be seen in FIGS. 6 and 7, the tensioning chain 10 extends tangentially from the chain guide groove 24 towards the tensioning member 9 in the side harness line 8 in the direction of the arrow 9' and the tensioning chain 10 extends substantially tangentially from the chain guide groove 24 in the direction of the arrow 14' towards the diverting hook 13 which subsequently leads to the tightening members 14 by which a user pulls the tensioning chain 10.

The locking element 12 is provided by an elongated rocking lever one end of which is pivotally mounted on a stub axle 29 which extends tranversely between the side plates 22. The rocking lever is constructed in one piece from sheet metal and is biased by a spring 26 in the direction of the arrow 39, see FIG. 7. The spring 26 is wound around the stub axle 29.

The other end 41 of the rocking lever 12 extends between the plate members 22 to form a trigger like actuator 41 for pivoting the lever in the direction of the arrow 38, see FIG. 7. As can be seen in FIG. 1, in use, the actuator end 41 extends generally in the direction of the center of the tire. Because of this, operation of the rocking lever is straightforward and simple and there is no danger of accidental release of the lever 12. At a position intermediate the ends of the rocking lever 12, in this case at a distance from the stub axle 29, of approximately one-third the length of the lever, a latch 25, see FIG. 7, extends from the lever 12 and is biased towards the roller 23 by the spring 26. The latch 25 engages the tensioning chain 10 in the chain engaging groove 24 of the roller 23. The latch 25 has a first surface 27, see FIG. 8, which faces the end of the tensioning chain 10 indicated by the arrow 14' and extends approximately radially relative to the roller 23 on engagement with the roller 23. An opposite end surface 28 of the latch 25 is angled towards the stub axle 29. Stop members formed by abstracts on the plate members 22 abut the rocking lever 12 to limit its movement.

The locking operation of the latch 25 is illustrated in FIGS. 8 and 9. Each alternate link of the tensioning chain 10 extends into the chain guide groove 24 and accordingly lies approximately in a radial plane of the roller 23 while the other links of the tensioning chain 10 lie upon the outer peripheral edge of the roller 23. When the latch 25 is engaged with the tensioning chain 10 as illustrated in FIG. 8, the surfaces 27 and 28 of the latch 25 permit movement of the tensioning chain in the direction of the arrow 14', namely, in the direction of which the pulling force is applied to the tensioning chain 10 to tighten the side harness line 8, and movement in the opposite direction, namely in the direction of the arrow 9' is prevented, thereby preventing slackening of the tension induced in the side harness line 8. In other words, as the tensioning chain 10 is moved in the direction of the arrow 14', the abutting action of a link of the tensioning chain 10 against the surface 28 of the latch 25 pivots the latch 25 and in turn the lever 12 in the direction of the curved arrow illustrated in FIG. 8, thereby permitting the tensioning chain 10 to pass by the latch 25 through the groove 24. On the other hand, the abutting action of a link of the tensioning chain 10 against the surface 27 of the latch 25 causes the latch 25 to remain in engagement with the tensioning chain 10, thereby preventing movement of the chain in the direction of the arrow 9'. The arrangement, as can be seen, is dimensioned in such a way that only a relatively small force is necessary to pivot the lever 12 in order to move the latch 25 out of engagement with the tensioning chain 10 so that even when the tensioning chain 10 is under substantial tensile force, the latch 10 can be disengaged from the tensioning chain 10 by a relatively small force applied to the actuator 41. The plate members 22 form formations to prevent the tightening member 14 passing through the locking device 11.

FIG. 9 illustrates the approximate mutual perpendicular arrangement of the planes of successive chain links of the tensioning chain 10 as they progress through the guide groove 24.

Referring now to FIG. 10, an expansion member 9 is illustrated. The expansion member 9 comprises an elongated hollow housing of thermo-plastics material comprising a lower shell 34 and an upper shell 35. Openings 33 in end walls of the housing accommodate securing elements 32.

A flat strip section 30 of vulcanized rubber is mounted in the interior of the housing 34, 35. The vulcanized rubber is of the type that it retains its pliability and elasticity even at low temperatures down to −50° C.

The flat strip section 30 is loosely inserted in the housing 34, 35 without any large lateral clearance. However, an expansion space is provided in the housing at each end of the flat strip to accommodate longitudinal expansion thereof. The sum of the expansion spaces in the housing at both ends of the flat strip section 30 corresponds to the allowable resilient pathway of the entire expansion member 9, in other words, the expansion member comprising the housing 34, 35, the flat section 30 and, the securing elements 32 attached to the flat section 30. This is the maximum extent to which the strip section 30 can be expanded under load. Thus, the housing acts as a limit means to limit the extent of expansion of the flat strip section 30. During expansion, the housing 34, 35 remains fixed in place, since it is not entrained with the movement of the section 30.

Shafts 31 extend at respective ends from the flat member 30 in the direction of the resilient pathway through the respective openings 33 with a small clearance to accommodate free and unimpeded movement of the shafts 31 in a longitudinal direction, namely, the direction of expansion and contraction of the section 30, while keeping lateral play of the shafts 31 in the openings 33 to a minimum. The shafts 31 are secured to the flat strip section 30 by a suitable adhesive or by vulcanization. A suitable adhesive may be, for example, a rubber-chlorohydrate based adhesive.

The flat strip section 30 formed from vulvanized rubber operates not only as an elastic medium but also at the same time as a damping element as a result of the relatively large hysteresis inherent in the material.

Eyes 32' are provided at the free ends of the shafts 31 for securing the shafts 31 to the ends of the harness chain 8 and to the end of the tensioning chain 10 and to the locking device 11.

The housing shells 34 and 35 are secured fixed together so that the elastic damping element is protected against water splashing and other external influences.

The full lines of FIG. 10 illustrate the expansion member 9 in its unloaded condition. The broken lines illustrate the member 9 under full load, in other words at maximum extension.

While the outer harness line has been described as being formed by a harness chain, it could be formed by any other suitable harness. For example, it could be formed by a harness constructed from wire rope, steel rope, rope of plastic material, or indeed any other suitable line material.

Further, it will be appreciated that while the inner side harness has been described as comprising a resilient stirrup formed from spring steel material, the stirrup could be formed of any other suitable material, such as, for example, a resilient plastic material or the like or any other suitable or desired material.

I claim:

1. An anti-skid chain for a vehicle tire which allows for rapid and simplified mounting on a tire while the vehicle bearing the tire is in place, comprising:
    a first side harness having a harness line extending between two ends, said harness line is a non-interrupted and a non-interruptable line,
    at least one elastic expansion member being provided in the harness line, at least one of the expansion members acting as a damper,
    locking means being connected to one end of the first side harness line
    a tensioning chain for tensioning the first side harness line, the tensioning chain being connected to the other end of said first side harness line, and passing through the locking means for closing said harness line, a releasable locking element mounted in the locking means for releasably locking the tensioning chain in the locking means in a direction opposite to a direction in which a tensioning force is applied to the tensioning chain for tensioning said harness line, stop means provided in the tensioning chain to prevent disengagement of the tensioning chain from the locking means, said stop means comprising a stop member provided on the free end of said tensioning chain, the stop member comprising an elastically expandable tightening member having a securing element at an end thereof for hooking onto said first side harness, said tightening member acting as a damping element and having dimensions to prevent it from being pulled through the locking device, a second side harness comprising an open ring-shaped resilient stirrup having two free ends biased towards each other to a closed position, the stirrup being elastically openable to an open position with the free ends spaced apart to slip over the tire tread, closure members mounted on the respective ends of the stirrup, the closure members being lockable together by bringing the ends of the stirrup towards each other to the closed position, and chain line sections connected to the first and second side harnesses to, in use, extend over the tire tread so that when the chain is mounted on a tire which is on a vehicle, said first side harness line is on an outer side of the tire and said second side harness is on an inner side of the tire.

2. An anti-skid chain as claimed in claim 1 in which each closure member comprises a flat plate extending substantially in a plane of the stirrup, a hooking tab being provided on each plate and being formed by bending a tab out of the plate plane, the tab of each closure member extending from the plate in a direction substantially opposite to the direction of closing of the stirrup, each plate having an opening adjacent the hooking tab, the opening being engagable with the hooking tab of the other closure member when the stirrup is in the closed position, the hooking tabs projecting from the plate of each closure member on the same side of the stirrup and being disposed on each plate in a position forward of the opening in the direction of closing of the stirrup.

3. An anti-skid chain as claimed in claim 2 in which each closure member is a mirror image of the other closure member.

4. An anti-skid chain as claimed in claim 1 in which the locking means comprises a housing having a chain guide groove for receiving links of the tensioning chain, the links of the tensioning chain lying alternately on two side edges of the chain guide groove or travelling perpendicularly thereto in the chain guide groove, the locking element comprising a latch pivotally mounted in the housing of the locking means, the latch being directed and biased towards the chain guide groove and being shaped to permit passage of the tensioning chain through the chain guide groove when the tensioning chain is pulled in the direction for tensioning the harness line, and to lock the tensioning chain in the chain guide groove to prevent passage of the chain through the chain guide groove in the opposite direction.

5. An anti-skid chain as claimed in claim 4 in which the chain guide groove is curved so that the tensioning chain extending from the harness line runs onto the chain guide groove substantially tangentially and the other portion of the tensioning chain extending from the chain guide groove runs tangentially from the chain guide groove towards the center of the vehicle tire.

6. An anti-skid chain as claimed in claim 5 in which a roller is rotatably mounted in the housing of the locking means, the chain guide groove being formed around the periphery of the roller.

7. An anti-skid chain as claimed in claim 4 in which an elongated rocking lever is provided in the locking means, the latch extending from the rocking lever intermediate the ends thereof, one end of the rocking lever being pivotally mounted in the housing of the locking means, and the other end of the rocking lever extending from the housing to form an actuating handle, the rocking lever being biased for biasing the latch towards the chain guide groove.

8. An anti-skid chain an claimed in claim 7 in which the rocking lever is pivotally mounted on a stub axle mounted in the housing of the rocking means, and is biased by an end of a biasing spring wound around the stub axle.

9. An anti-skid chain as claimed in claim 8 in which a stop member is provided in the housing of the locking means to abut the rocking lever.

10. An anti-skid chain as claimed in claim 7 in which the portion of the locking means forming the chain guide groove is composed of a plastic material.

11. An anti-skid chain as claimed in claim 1 in which a formation corresponding to a width of the portion of the stop member adjacent the locking means is provided on the locking means for engaging the stop member.

12. An anti-skid chain as claimed in claim 11 in which the stop member forms a handle.

13. An anti-skid chain as claimed in claim 1 in which the securing element is a hook.

14. An anti-skid chain as claimed in claim 1 in which the tightening member comprises an elastic expansion member of vulcanized rubber terminating in the securing element.

15. An anti-skid chain as claimed in claim 1 in which the tightening member is pivotally mounted on the tensioning chain.

16. An anti-skid chain as claimed in claim 1 in which at least one diverting element is mounted on the first side harness, and directed towards the center of the vehicle tire, in use, for diverting the tensioning chain to a region opposite the locking means.

17. An anti-skid chain as claimed in claim 1 in which at least one of the elastic expansion members acting as a damping element in the harness line comprises an expandable member of elastically expandable vulcanised rubber.

18. An anti-skid chain as claimed in claim 17 in which securing elements are secured to the ends of the damping element.

19. An anti-skid chain as claimed in claim 17 in which the damping element comprises a vulcanized rubber which substantially retains its elastic expansion properties at low temperatures.

20. An anti-skid chain as claimed in claim 19 in which the securing elements are secured to the damping element by an adhesive.

21. An anti-skid chain as claimed in claim 20 in which limit means to limit the expansion of the damping element is provided.

22. An anti-skid chain as claimed in claim 21 in which each damping element is enclosed in a housing, the securing elements extending through the housing, at least one of the securing elements being slidable through the housing in the direction of expansion.

23. An anti-skid chain as claimed in claim 22 in which the housing of the damping element comprises two half shells secured together, each of the securing elements comprising a respective shaft extending in the direction of expansion, the housing having openings to slidably accommodate each shaft.

24. An anti-skid chain as claimed in claim 1 in which the stirrup of the inner side harness is prestressed into a closed position in such a way that when the stirrup is spread apart to the open position during assembly of the anti-skid chain onto a vehicle tire and springs back to the closed position the closure members automatically lock together.

25. An anti-skid chain as claimed in claim 14 in which the vulcanized rubber of the elastic expansion member of the tightening member retains its elastic expansion properties at low temperatures.

26. An anti-skid chain as claimed in claim 19 or 25 in which the vulcanized rubber substantially retains its elastic expansion properties at temperatures down to $-50°$ C.

27. An anti-skid chain as claimed in claim 20 in which the adhesive is a rubber-chlorohydrate based adhesive.

28. An anti-skid chain as claimed in claim 1 in which the tightening member comprises an elastic expansion member of plastic material.

29. An anti-skid chain as claimed in claim 10 in which the plastic material is a thermo-plastic material.

30. An anti-skid chain as claimed in claim 1 in which at least one of the elastic expansion members acting as a damping element in the harness line comprises an expandable member of plastic material.

* * * * *